A. S. HICKLEY.
RAILWAY SIGNAL OPERATING DEVICE.
APPLICATION FILED APR. 24, 1908.

924,227.

Patented June 8, 1909.

Witnesses
F. L. Ourand
W. Parker Reinohl

Inventor
A. S. Hickley.
By D. C. Reinohl
Attorney

UNITED STATES PATENT OFFICE.

ARTHUR S. HICKLEY, OF MANASQUAN, NEW JERSEY.

RAILWAY-SIGNAL-OPERATING DEVICE.

No. 924,227. Specification of Letters Patent. Patented June 8, 1909.

Application filed April 24, 1908. Serial No. 429,029.

*To all whom it may concern:*

Be it known that I, ARTHUR S. HICKLEY, a subject of the King of Great Britain, residing at Manasquan, in the county of Monmouth and State of New Jersey, have invented certain new and useful Improvements in Railway-Signal-Operating Devices; and I do hereby declare the following to be a full, clear, and exact description of the invention, such as will enable others skilled in the art to which it appertains to make and use the same.

My invention relates primarily to railway signals, has especial reference to electrically operated signals, has for its object economy and certainty of operation, and the invention consists in certain improvements in construction, which will be fully disclosed in the following specification and claims.

Signals have heretofore been operated by the use of primary batteries, or secondary batteries charged from a direct current circuit, and where alternating current only has been available, a rotary transformer has been used for changing the alternating into direct currents, which involves great loss and requires considerable attention. It has also been proposed to operate electrically controlled devices for working signals by alternating currents, but these have never proved as satisfactory as direct currents, because of the uncertainty of their starting immediately when required, beside mechanical and heating difficulties attending their use.

It is my purpose to utilize alternating currents by changing them into direct currents through the medium of an electrolytic current rectifier, and using these rectified currents for operating electrical devices for working the signals direct without the use of storage batteries, or for operating electrical devices which in turn operate mechanical devices for working the signals, and thereby overcoming the serious defects enumerated.

Figure 1:
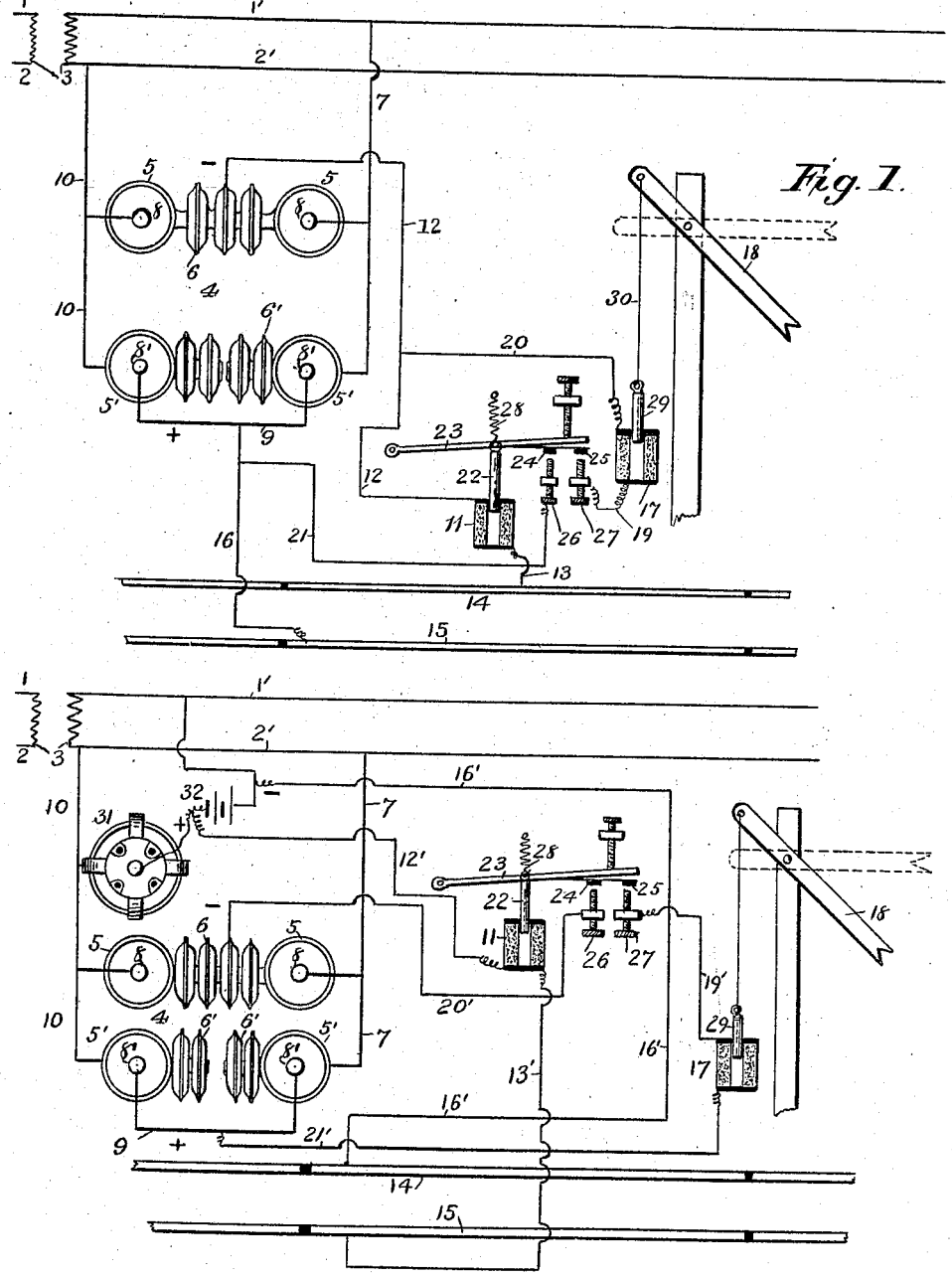
Figure 2:
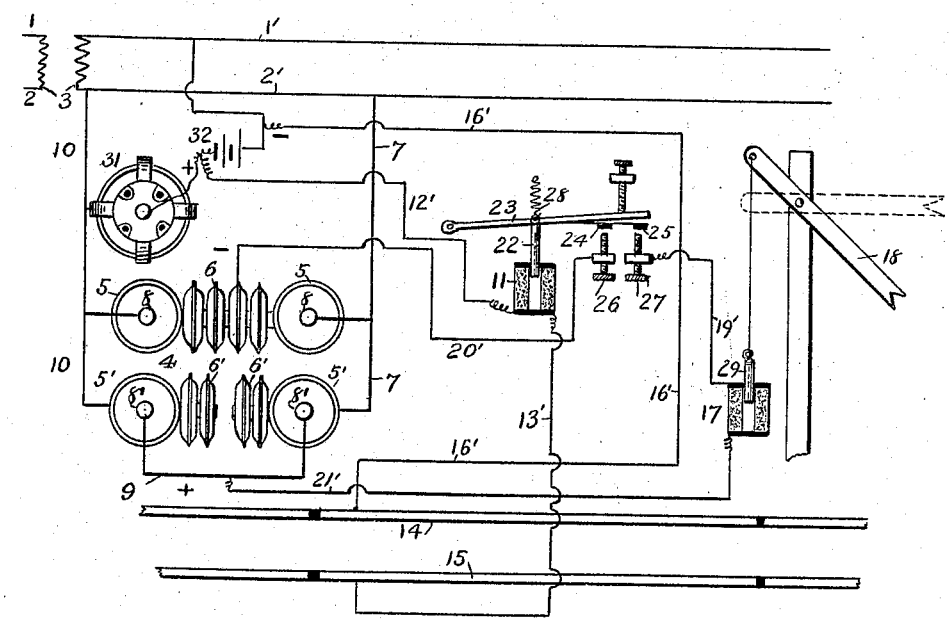

In the accompanying drawings, which form part of this specification:—Figure 1 represents a diagrammatic view partly in plan and partly in elevation showing the application of my invention to a railway signal, and Fig. 2 a like view of a modified construction.

Reference being had to the drawings and the designating characters thereon, the numeral 1 indicates one of the main lines for supplying alternating electric currents, 2 the other line, 3 a transformer in the main lines, which are of ordinary and well known construction.

4 indicates an electrolytic current rectifier, preferably composed of cells 5, 5′ and hollow members 6 and 6′ connected thereto, in communication therewith and forming an electrode through which the electrolyte circulates, as shown and described in Letters-Patent of the United States granted to me, July 30, 1907, and numbered 861,281. The rectifier 4 is connected to the secondary line 1′ of the transformer by wire 7, which connects with the electrode 8 of cell 5 and continues to the next cell 5′ and the electrodes 8′ of the cells 5′, 5′ are connected together by wire 9; and the secondary line 2′ is connected to the electrode 8 of the opposite cell 5 by wire 10, and said wire continues to the next cell 5′, as shown in Fig. 1. The cells 5′, 5′ and their hollow members 6′ 6′ are separate and distinct, but their electrodes 8′ 8′ are connected together by the wire 9, while the cells 5, 5, are connected by the continuous hollow member 6.

11 indicates a relay, which is connected to the hollow electrode 6, forming one pole of the rectifier, by wire 12, and from the relay extends a wire 13, which is connected to one of the railway rails 14, and the opposite rail 15 is connected to the other pole of the rectifier by wire 16; the rails 14 and 15 being properly insulated at their ends, thus forming an open circuit, which is closed when the wheels of a car with their axle engage the rails.

The electrically operated device 17 for controlling the signal 18 is connected to one pole of the rectifier 4 by wires 20 and 12 and to the other pole of the rectifier by wires 21 and 19, having in their path the contact screws 26 and 27 connected to the relay. The core or armature 22 of the relay 11 is connected to a pivoted arm 23 on which are two contacts 24 and 25 electrically connected together and adapted to engage with the screw contacts 26 and 27, when the core 22 is drawn into the body of the relay when the current is passing, the spring 28, tending to keep the core out of the body when the current is not passing. The core 29 of the operating device 17, is connected to the signal 18, by rod 30.

It is obvious that other electrically controlled devices such as electric, pneumatic or hydraulic motors may be substituted for controlling the signal, without departing from the spirit of my invention.

When the signal 18, relay 11, or both are located in a signal tower, the main signals or the devices for operating them may be manipulated by the attendant in the tower.

In Fig. 2 an additional electrolytic current-rectifier 31 is shown for charging a battery 32, preference also being given to one of the rectifiers shown and described in my Patent #861,281. One pole of the battery is connected to the relay 11 by wire 12′, and the relay is connected to the rail 15 by wire 13′, and rail 14 is connected to the opposite pole of the battery by wire 16′. The rectifier 4 in the latter arrangement of the parts is connected to the secondary lines 1′ and 2′ as in the former, but the rectified current is conducted from one of the poles of the rectifier to the device 17, by wire 21′, and said device is connected to the opposite pole of the rectifier by wires 19′ and 20′ through the medium of the contacts 24 and 25 on the arm 23, and the screw contacts 26 and 27, when the core 22 of the relay is drawn in.

By the construction shown in Fig. 1, the relay and the signal operating device are supplied by direct current from the rectifier, both impulses being used without the use of a storage battery, while in the construction shown in Fig. 2, the relay is operated by a battery 32 which is kept charged by a separate rectifier, while the signal operating device 17 is supplied with direct current from the rectifier 4, without a storage battery being introduced in the circuit.

It is obvious that analogous devices, such as switch points, may be operated in like manner as the signal described, by suitable connections with the above described devices.

Having thus fully described my invention, what I claim is—

1. In a railway signal operating device, main lines for supplying alternating current, an electrolytic rectifier comprising a double, and two single cells, one of the active electrodes in the double cell being connected to one of the alternating lines and the other active electrode connected to the other alternating line, and one of the single cells having its non-active electrode connected to one of the alternating lines and the other non active electrode connected to the other alternating line, and their two active electrodes connected together by a suitable wire, and a connection between said wire, a signal operating device, and an insulated rail, for delivering a positive direct current, and a wire connecting the non-active electrode of the double cell, said wire connected to the signal operating device and to the other insulated rail, for delivering a negative current, whereby storage batteries are dispensed with and perfectly uniform current is obtained.

2. In a railway signal operating device, main lines for supplying alternating current, an electrolytic rectifier comprising a double, and two single cells, one of the active electrodes in the double cell being connected to one of the alternating lines and the other active electrode connected to the other alternating line, and one of the single cells having its non-active electrode connected to one of the alternating lines and the other non-active electrode connected to the other alternating line, and their two active electrodes connected together by a suitable wire, and a connection between said wire, a signal operating device, and an insulated rail for delivering positive direct current, and a wire connecting the non-active electrode of the double cell, said wire connected to the signal operating device and relays, and to the other insulated rail for delivering a negative current, whereby storage batteries are dispensed with and a perfectly uniform current is obtained.

In testimony whereof I affix my signature, in presence of two witnesses.

ARTHUR S. HICKLEY.

Witnesses:
D. C. REINOHL,
W. PARKER REINOHL.